US009562607B2

United States Patent
Bang

(10) Patent No.: US 9,562,607 B2
(45) Date of Patent: Feb. 7, 2017

(54) SYSTEM AND METHOD FOR ARTIFICIALLY INTERLOCKING AUTOMATIC TRANSMISSION BY OPERATING TRANSMISSION SOLENOID VALVE

(71) Applicant: HYUNDAI MOTOR COMPANY, Seoul (KR)

(72) Inventor: Sung Hoon Bang, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/948,142

(22) Filed: Nov. 20, 2015

(65) Prior Publication Data
US 2016/0298762 A1    Oct. 13, 2016

(30) Foreign Application Priority Data

Apr. 7, 2015   (KR) .......................... 10-2015-0049098

(51) Int. Cl.

| F16H 63/36 | (2006.01) |
|---|---|
| F16H 59/44 | (2006.01) |
| B60W 30/08 | (2012.01) |
| B60W 30/095 | (2012.01) |
| F16H 59/58 | (2006.01) |
| F16H 59/36 | (2006.01) |

(52) U.S. Cl.
CPC .............. *F16H 63/36* (2013.01); *F16H 59/36* (2013.01); *F16H 59/44* (2013.01); *F16H 59/58* (2013.01); *B60W 30/08* (2013.01); *B60W 30/095* (2013.01); *B60W 30/0953* (2013.01); *B60W 30/0956* (2013.01); *F16H 2059/366* (2013.01)

(58) Field of Classification Search
None
See application file for complete search history.

(56) References Cited

U.S. PATENT DOCUMENTS

| 6,017,102 A * | 1/2000 | Aga ........................ B60T 7/12 |
|---|---|---|
| | | 303/125 |
| 2013/0131945 A1 * | 5/2013 | Kimura .................. G08G 1/166 |
| | | 701/70 |

FOREIGN PATENT DOCUMENTS

| JP | 2006-527342 A | 11/2006 |
|---|---|---|
| JP | 2009-143445 A | 7/2009 |

(Continued)

*Primary Examiner* — Colby M Hansen
(74) *Attorney, Agent, or Firm* — McDermott Will & Emery LLP

(57) ABSTRACT

A system for artificially interlocking an automatic transmission includes an engine RPM sensor and a vehicle speed sensor. A pair of ultrasonic sensors measure a relative velocity of a vehicle to a neighbor vehicle, and an angle measuring sensor measures a degree of an angle variation of a steering wheel. An ECU determines whether an accelerator pedal is erroneously operated by monitoring sensing signals of the engine RPM sensor and the vehicle speed sensor, to determine whether the accelerator pedal is erroneously operated by using sensing signals of the ultrasonic sensors, and to determine whether the accelerator pedal is erroneously operated by monitoring a signal of the angle measuring sensor. A transmission control unit (TCU) performs an artificial interlock control of the automatic transmission when a determination signal, which informs that the accelerator pedal is erroneously operated, is received from the ECU.

8 Claims, 2 Drawing Sheets

(56) References Cited

FOREIGN PATENT DOCUMENTS

| JP | 2011-157058 A | 8/2011 |
|---|---|---|
| JP | 2013-249830 A | 12/2013 |
| KR | 10-2012-0059762 A | 6/2012 |
| KR | 10-2014-0091333 A | 7/2014 |

* cited by examiner

SYSTEM AND METHOD FOR ARTIFICIALLY INTERLOCKING AUTOMATIC TRANSMISSION BY OPERATING TRANSMISSION SOLENOID VALVE

CROSS-REFERENCE TO RELATED APPLICATION

This application claims under 35 U.S.C. §119(a) the benefit of priority to Korean Patent Application No. 10-2015-0049098 filed on Apr. 7, 2015, which is incorporated by reference herein in its entirety.

TECHNICAL FIELD

The present disclosure relates to a system for artificially interlocking an automatic transmission and a method for the same, and more particularly, to a system for inducing safe driving by artificially interlocking an automatic transmission, which prevents an engine power from being transferred to a driving wheel by operating an artificial interlock control of the automatic transmission when an accelerator pedal operation error occurs, and a method for the same.

BACKGROUND

In general, an automatic transmission for a vehicle is controlled using a hydraulic pressure for driving a transmission solenoid valve after a target gear ratio is set based on a transmission map table. The transmission map table is set by a transmission control unit (TCU) according to various kinds of detecting conditions, such as oil temperature, coolant temperature, air temperature, a quantity of air, etc., as well as a driving speed and an opening rate of a throttle valve. Gear shift is performed through transmission control by a plurality of transmission operating elements.

The automatic transmission includes a release element which is released in an operating state and an engagement element which is engaged in an operation releasing state, as the gear shift is executed into the target gear ratio. The release and engagement operations are performed through the control of hydraulic pressure supplied to each element.

When the gear shift is performed in an automatic transmission in which the engagement-side element is pressed before the release-side element is released, an interlock phenomenon may occur due to accumulation of the hydraulic pressure on each operating element. Then, the operating elements of the automatic transmission are temporarily locked. When the interlock phenomenon occurs, a shock is generated, thus degrading the shift and ride qualities. In addition, power may not be transmitted from the transmission to a wheel in a moment.

Therefore, there exists a need to prevent the interlock phenomenon from occurring since the interlock phenomenon occurs due to a transmission control error of an automatic transmission.

The description provided above as a related art of the present disclosure is just for helping in understanding the background of the present disclosure and should not be construed as being included in the related art known by those skilled in the art.

SUMMARY

The present disclosure has been made in an effort to solve these problems and to provide a system for inducing safe driving by artificially interlocking an automatic transmission, which prevents an engine power from being transferred to a driving wheel by operating an artificial interlock control of the automatic transmission when a driver operates an accelerator pedal erroneously (for example, an unintended acceleration), and a method for the same.

According to an exemplary embodiment of the present inventive concept, a system for artificially interlocking an automatic transmission includes an engine revolutions per minute (RPM) sensor configured measure an engine RPM and a vehicle speed sensor configured to measure a vehicle speed. A pair of ultrasonic sensors are configured to measure a relative velocity of a vehicle to a neighbor vehicle. An angle measuring sensor is configured to sense a degree of an angle variation of a steering wheel. An electronic control unit (ECU) is configured to firstly determine whether an accelerator pedal is erroneously operated by monitoring sensing signals of the engine RPM sensor and the vehicle speed sensor, to secondarily determine whether the accelerator pedal is erroneously operated by using a sensing signal of the ultrasonic sensors, and to thirdly determine whether the accelerator pedal is erroneously operated by monitoring a signal of the angle measuring sensor. A transmission control unit (TCU) is configured to perform an interlock control of the automatic transmission when a determination signal, which informs that the accelerator pedal is erroneously operated, is received from the ECU.

According to another exemplary embodiment of the present inventive concept, a method for artificially interlocking an automatic transmission includes firstly determining whether an accelerator pedal is erroneously operated by monitoring degrees of engine RPM and vehicle speed variations; secondarily determining whether the accelerator pedal is erroneously operated by monitoring a relative velocity of a vehicle to a neighbor vehicle by using an ultrasonic sensor; thirdly determining whether the accelerator pedal is erroneously operated by monitoring a degree of an angle variation of a steering wheel; and iv) performing an artificial interlock control of the automatic transmission when it is determined that the accelerator pedal is erroneously operated based on determination results of the steps of determining.

In the step of primarily determining, when the degrees of the engine RPM and vehicle speed variations are remained to be equal to or greater than a reference value, which is determined through an examination performed before a vehicle is mass-produced, for a reference time, it is determined that the accelerator pedal is erroneously operated.

In the step of second determining, the relative velocity is monitored by measuring a time difference between waves of first and second ultrasonic sensors reflected upon the neighbor vehicle while the vehicle has the first and second ultrasonic sensors mounted to front and rear portions of the vehicle, respectively.

When the time difference between the reflected waves of the first and second ultrasonic sensors is within a reference time, it is determined that the accelerator pedal is erroneously operated.

In the step of thirdly determining, when the steering wheel is operated at a reference angle or more and a reference number of times or more as a result of monitoring the degree of the angle variation of the steering wheel, it is determined that the accelerator pedal is erroneously operated.

In the step of performing, the artificial interlock control is performed by operating a plurality of transmission solenoid valves included in the automatic transmission in an abnormal operation combination.

BRIEF DESCRIPTION OF THE DRAWINGS

The above and other features of the present disclosure will now be described in detail with reference to certain exemplary embodiments thereof illustrated by the accompanying drawings which are given herein below by way of illustration only, and thus are not limitative of the present disclosure.

Figure 1:
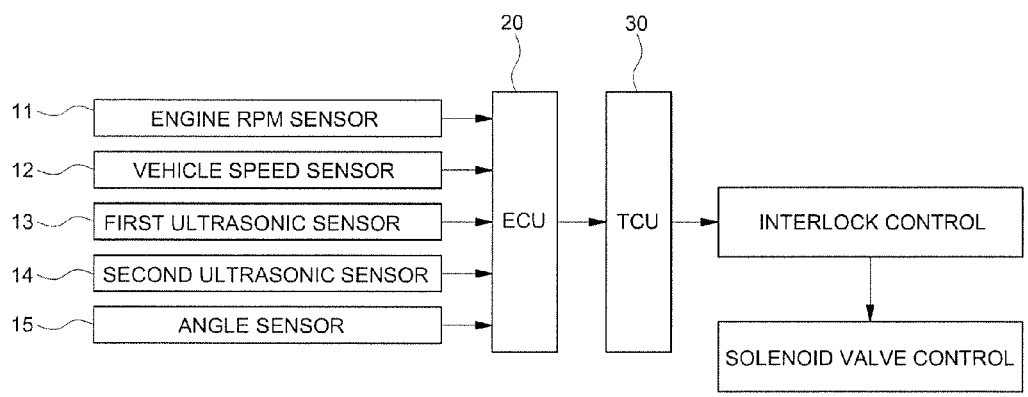
FIG. 1 is a block diagram illustrating a system for artificially interlocking an automatic transmission according to an embodiment of the present inventive concept.

It should be understood that the appended drawings are not necessarily to scale, presenting a somewhat simplified representation of various features of the present disclosure as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of an electro-hydraulic brake system and a method for controlling the same of the present disclosure, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents, and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described with reference to the accompanying drawings.

An aspect of the present disclosure provides a system and a method for inducing a safe driving of a vehicle by using an interlock phenomenon occurring due to a transmission control error of an automatic transmission.

That is, according to the present disclosure, when an accelerator pedal operation error (sudden unintended acceleration) occurs by a driver, the automatic transmission is artificially interlock-controlled to prevent an engine power from being transmitted to a wheel, thus preventing an accident.

FIG. 1 is a block diagram illustrating a system for artificially interlocking an automatic transmission according to an embodiment of the present inventive concept.

As shown in FIG. 1, a system for artificially interlocking an automatic transmission according to an embodiment of the present inventive concept includes an engine revolutions per minute (RPM) sensor 11 for sensing an engine RPM, a vehicle speed sensor 12 for measuring a current speed of a vehicle, first and second ultrasonic sensors 13 and 14 for measuring a relative velocity to a neighbor vehicle (obstacle), and an angle measuring sensor 15 for measuring a degree of an angle variation of a steering wheel, as input elements for determining whether an accelerator pedal is erroneously operated.

In addition, the system includes an electronic control unit (ECU) 20 configured to determine whether an accelerator pedal is erroneously operated, and a transmission control unit (TCU) 30 configured to perform an artificial interlock control of the automatic transmission when a determination signal representing that the accelerator pedal is erroneously operated is received.

The ECU 20 firstly determines whether the accelerator pedal is erroneously operated by monitoring sensing signals of the engine RPM and vehicle speed sensors 11 and 12; secondarily determines whether the accelerator pedal is erroneously operated by using the sensing signals of the first and second ultrasonic sensors 13 and 14; and thirdly determines whether the accelerator pedal is erroneously operated by monitoring a signal of the angle measuring sensor 15.

When the ECU 20 determines that the accelerator pedal is erroneously operated, an instruction to artificially interlock-control the automatic transmission is transmitted from the ECU 20 to the TCU 30, so that the TCU 30 performs the artificial interlock control for the automatic transmission.

In this case, the artificial interlock control of the automatic transmission by the TCU is performed by operating a plurality of transmission solenoid valves included in the automatic transmission in an abnormal operation combination (for example, a combination of an operation of closing several valves which need to be normally open-operated among a plurality of valves for a current speed level 2 and an operation of opening several valves which need to be normally close-operated).

The automatic transmission cannot transmit the engine power to the wheel in an interlock state. Thus, the engine power is prevented from being transmitted to the wheel during an accelerator pedal erroneous operation, so that an accident may be prevented and a safe driving may be induced.

Figure 3:
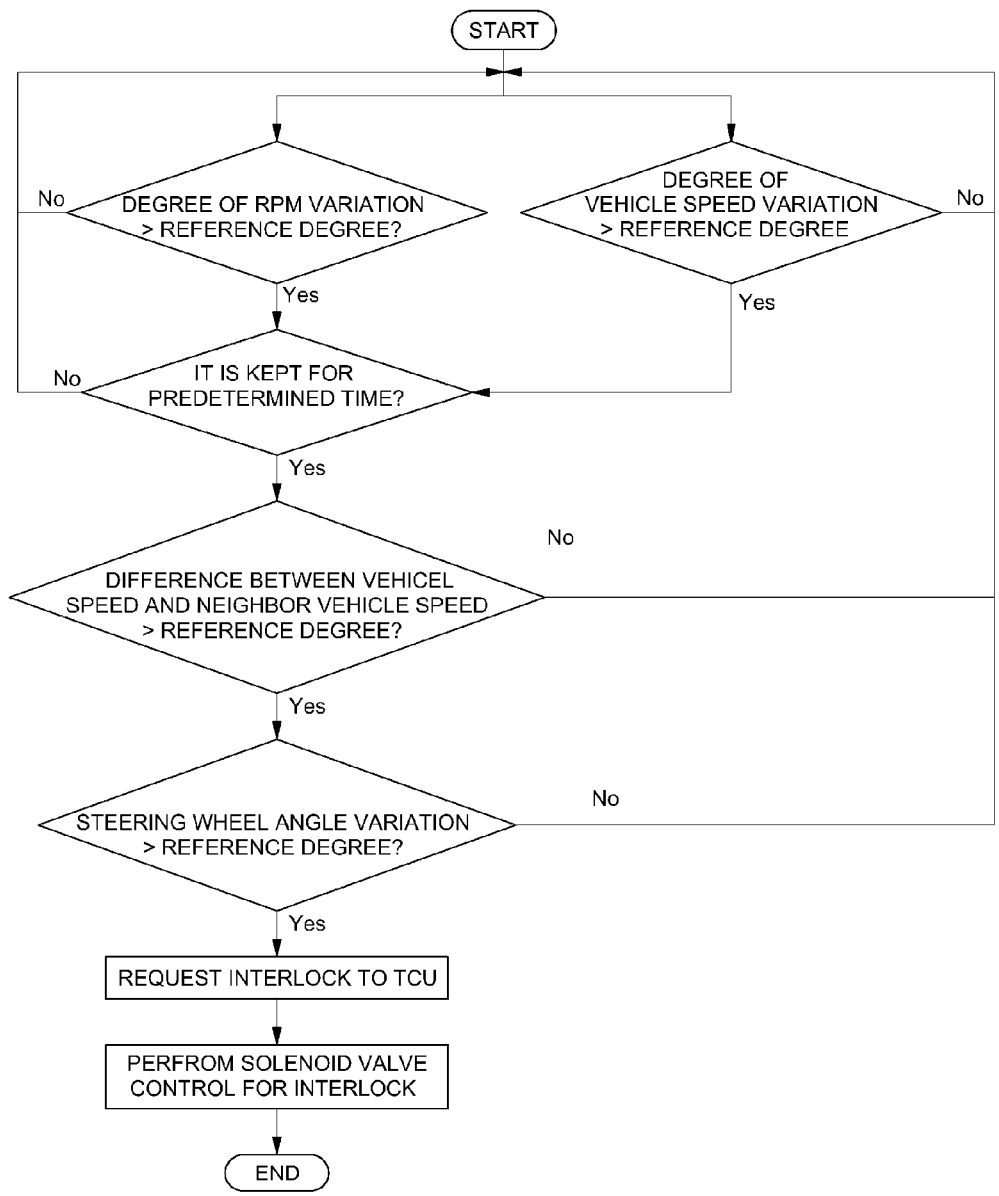
FIG. 3 is a flowchart illustrating a method for artificially interlocking an automatic transmission according to an embodiment of the present inventive concept.

Hereinafter, based on the above-described configuration, a method for artificially interlocking an automatic transmission according to the present disclosure will be described as follows with reference to FIG. 3.

First, the ECU 20 monitors an engine RPM variation sensed by the engine RPM sensor 11 and a vehicle speed variation sensed by the vehicle speed sensor 12 and determines whether the accelerator pedal is erroneously operated.

When the degrees of the engine RPM and vehicle speed variations, which are equal to or greater than a reference value (which is a reference for determining the possibility of an accelerator pedal erroneous operation) determined through an examination performed before a vehicle is mass-produced, are kept for a reference time, the ECU 20 determines that the accelerator pedal is erroneously operated.

Next, the ECU 20 monitors a relative velocity of the vehicle to a neighbor vehicle (or obstacle) by using the reflected waves of the first and second ultrasonic sensors 13 and 14 mounted to front and rear portions of the vehicle in order to perform the logic of secondarily determining whether the accelerator pedal is erroneously operated.

Figure 2:
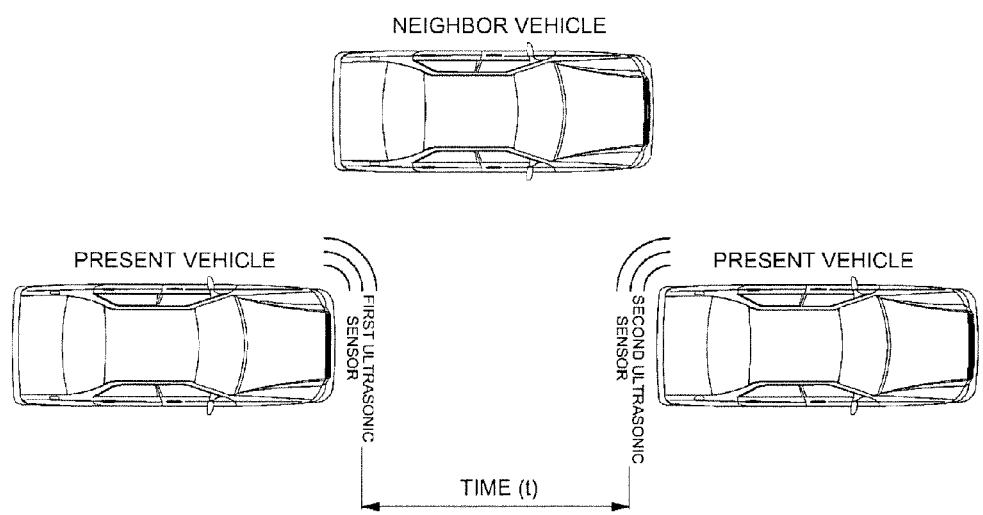
FIG. 2 is a schematic view illustrating a principle of measuring a relative velocity to a neighbor vehicle by using an ultrasonic sensor of the system for artificially interlocking of an automatic transmission according to an embodiment of the present inventive concept.

As shown in FIG. 2, the relative velocity of a vehicle to a neighbor vehicle is monitored by measuring a time difference between the waves of first and second ultrasonic sensors 13 and 14 reflected upon the neighbor vehicle while the vehicle travels in a state that the first and second ultrasonic sensors 13 and 14 are mounted to the front and rear portion of the vehicle.

That is, when the time difference between the reflected waves of the first and second ultrasonic sensors 13 and 14 is within a reference time, the ECU 20 secondarily determines that the accelerator pedal is erroneously operated.

For example, when the vehicle travels faster than a neighbor vehicle, the time taken to receive the reflected wave of the second ultrasonic sensor 14 after the reflected wave of the first ultrasonic sensor 13 is received is short. In contrast, when the vehicle travels at a speed similar to that of a neighbor vehicle, the time taken to is long. Therefore, the ECU 20 secondarily determines that the accelerator pedal is erroneously operated when the time difference between the reflected waves of the first and second ultrasonic sensors 13 and 14 is within the reference time.

Then, the logic of thirdly determining whether the accelerator pedal is erroneously operated is performed by monitoring the degree of the angle variation of a steering wheel manually operated by a driver according to a signal from the angle measuring sensor 15.

When it is monitored that the steering wheel is operated at a reference angle or more and a reference number of times or more as a result of monitoring the degree of the angle variation of the steering wheel by the ECU 20, which is manually operated by a driver, the ECU 20 thirdly determines that the accelerator pedal is erroneously operated.

In other words, when the vehicle is in an abrupt acceleration situation, it is expected that the driver continuously operates the steering wheel at a high speed in order to avoid neighbor vehicles. Thus, when it is monitored that the steering wheel is operated at the reference angle or more and the reference number of times or more, the ECU 20 thirdly determines that the accelerator pedal is erroneously operated.

As described above, the determination of the accelerator pedal erroneous operation is performed three times. When it is determined that the accelerator pedal is erroneously operated in the third determination, the ECU 20 instructs the TCU 30 to perform the artificial interlock control.

The artificial interlock control of the automatic transmission by the TCU is performed, as described above, by operating the transmission solenoid valves included in the automatic transmission in the abnormal operation combination which is out of the normal operation combinations, and the automatic transmission is prevented from transmitting the engine power to the wheel in the interlock state, so that the vehicle may be prevented from being abruptly accelerated in the situation of the accelerator pedal erroneous operation, thereby inducing the vehicle to be safely driven.

As described above, when the engine RPM, the degree of a vehicle speed variation, the relative velocity to an opposite vehicle (obstacle) obtained by using the ultrasonic sensor, and the degree of a steering wheel angle variation are monitored and it is determined that a driver erroneously operates an accelerator pedal (for example, a doubtful situation about sudden unintended acceleration), the automatic transmission is artificially interlock-controlled. Thus, the engine power is prevented from being transmitted to the wheel due to the transmission interlock. That is, the vehicle may be prevented from being abruptly accelerated so that the vehicle may be induced to be safely driven.

According to the present disclosure, when a driver unknowingly, erroneously operates an accelerator pedal (for example, a sudden unintended acceleration), the automatic transmission is artificially interlock-controlled by monitoring the engine RPM, the degree of a vehicle speed variation, the relative velocity to an opposite vehicle (obstacle) obtained by using the ultrasonic sensor, and the degree of a steering wheel angle variation. Thus, the engine power is prevented from being transmitted to the wheel in an interlock state of the automatic transmission, thereby inducing the vehicle to be safely driven in the situation of an accelerator pedal erroneous operation.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A system for artificially interlocking an automatic transmission, the apparatus comprising:
    an engine revolutions per minute (RPM) sensor configured to measure an engine RPM;
    a vehicle speed sensor configured to measure current vehicle speed;
    a pair of ultrasonic sensors configured to measure a relative velocity of a vehicle to a neighbor vehicle
    an angle measuring sensor configured to measure a degree of an angle variation of a steering wheel;
    an electronic control unit (ECU) configured to firstly determine whether an accelerator pedal is erroneously operated by monitoring sensing signals of the engine RPM sensor and the vehicle speed sensor, to secondarily determine whether the accelerator pedal is erroneously operated by using sensing signals of the ultrasonic sensors, and to thirdly determine whether the accelerator pedal is erroneously operated by monitoring a signal of the angle measuring sensor; and
    a transmission control unit (TCU) configured to perform an artificial interlock control of the automatic transmission when a determination signal, which informs that the accelerator pedal is erroneously operated, is received from the ECU.

2. A method for artificially interlocking an automatic transmission, the method comprising:

firstly determining, by an electronic control unit (ECU), whether an accelerator pedal is erroneously operated by monitoring degrees of an engine RPM variation and a vehicle speed variation;

secondarily determining, by the ECU, whether the accelerator pedal is erroneously operated by monitoring a relative velocity of a vehicle to a neighbor vehicle by using an ultrasonic sensor;

thirdly determining, by the ECU, whether the accelerator pedal is erroneously operated by monitoring a degree of an angle variation of a steering wheel; and performing, by a transmission control unit (TCU), an artificial interlock control of the automatic transmission when it is determined that the accelerator pedal is erroneously operated based on determination results from the previous steps of determining.

3. The method of claim 2, wherein, in the step of firstly determining, when the degrees of the engine revolutions per minute (RPM) and vehicle speed variations are maintained to be equal to or greater than a reference value, which is determined through an examination performed before a vehicle is mass-produced, for a reference time, it is determined that the accelerator pedal is erroneously operated.

4. The method of claim 2, wherein the relative velocity is monitored by measuring a time difference between waves of first and second ultrasonic sensors, which are reflected upon the neighbor vehicle, while the vehicle has the first and second ultrasonic sensors mounted to front and rear portions of the vehicle, respectively.

5. The method of claim 4, wherein, when the time difference between the reflected waves of the first and second ultrasonic sensors is within a reference time, it is determined that the accelerator pedal is erroneously operated.

6. The method of claim 2, wherein, in the step of thirdly determining, when the steering wheel is operated at a reference angle or more and a reference number of times or more as a result of monitoring the degree of the angle variation of the steering wheel, it is determined that the accelerator pedal is erroneously operated.

7. The method of claim 2, wherein, in the step of performing, the artificial interlock control is performed by operating a plurality of transmission solenoid valves included in the automatic transmission in an abnormal operation combination.

8. The method of claim 2, wherein an abnormal operation combination includes an operation of closing several valves which are normally opened among the plurality of transmission solenoid valves and an operation of opening the several valves which are normally closed.

* * * * *